United States Patent

Rasp et al.

[11] 4,000,079
[45] Dec. 28, 1976

[54] ANTICORROSIVES

[75] Inventors: Christian Rasp, Cologne; Artur Botta, Krefeld, both of Germany

[73] Assignee: Bayer Aktiengesellschaft, Leverkusen, Germany

[22] Filed: June 27, 1973

[21] Appl. No.: 374,203

[30] Foreign Application Priority Data

July 18, 1972  Germany ............ 2235093

[52] U.S. Cl. .................. 252/75; 252/77; 252/78.1; 252/390; 252/391; 260/304 R; 260/309.2

[51] Int. Cl.² ................ C09K 5/00; C09K 15/30; C23F 11/14; C23F 11/16

[58] Field of Search ............... 252/70, 75, 77, 78, 252/390, 391; 260/309.2, 304

[56] References Cited

UNITED STATES PATENTS

| | | | |
|---|---|---|---|
| 2,466,517 | 4/1949 | Blair | 252/390 X |
| 2,468,163 | 4/1949 | Blair | 252/390 X |
| 2,739,872 | 3/1956 | Senkus | 252/390 X |
| 3,231,494 | 1/1966 | Moray | 252/387 X |
| 3,399,197 | 8/1968 | Roberts | 260/256.4 |

FOREIGN PATENTS OR APPLICATIONS

| | | | |
|---|---|---|---|
| 2,110,227 | 10/1972 | Germany | 260/309.2 |
| 1,064,473 | 4/1967 | United Kingdom | 252/70 |
| 1,210,370 | 10/1970 | United Kingdom | 252/70 |
| 1,023,792 | 3/1966 | United Kingdom | 260/309.2 |
| 1,369,303 | 10/1974 | United Kingdom | 260/309.2 |

*Primary Examiner*—Dennis L. Albrecht
*Attorney, Agent, or Firm*—Burgess, Dinklage & Sprung

[57] ABSTRACT

Corrosion-inhibiting aqueous solutions and corrosion inhibiting antifreeze agents based on glycols and aqueous solutions thereof are prepared by adding two such solutions and agents already containing conventional corrosion inhibitors, heterocyclic nitrogen compounds having the formula:

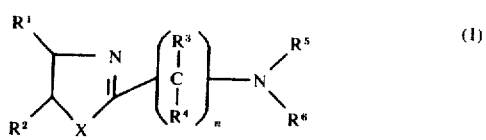

wherein:

$R^1$ and $R^2$ are hydrogen or together with the carbon atoms to which they are attached represent an optionally substituted benzene ring;

$R^3$, $R^4$, $R^5$ and $R^6$ independently of one another are selected from the group of hydrogen, lower alkyl, phenyl substituted by one or more lower alkyls;

X is sulphur or an imino group (NH) optionally substituted on the nitrogen atom; and n is an integer from 1 to 13, added to an aqueous solution or antifreeze agent which contains at least one conventional corrosion inhibitor.

27 Claims, No Drawings

ANTICORROSIVES

BACKGROUND

This invention relates to new corrosion-inhibiting aqueous solutions, anticorrosives and antifreeze agents, and to their production.

Water is used in a steadily increasing number of heat-transfer systems and heat exchangers, for example motor-vehicle radiators and hot-water heating systems. However, disadvantages of using water in such systems include its freezing point which in the winter months is frequently above the outside temperature, and its corrosive effect upon the metal surfaces of the heat-transfer systems.

Antifreeze agents based on glycols which are commercially available have been effectively used to lower the freezing point of water.

It is known that iron alloys for example, cast iron and mild steel, quickly corrode or rust when in contact with water and in the presence of air. It is also known that the rusting or corrosion of iron and other metals in water is promoted by glycols. In order to prevent this corrosion, a number of chemicals have already been proposed for use as corrosion inhibitors, including, for example, soda, sodium nitrite, sodium nitrate, borax, sodium dichromate, alkali salts of arsenous acid, arsenic acid, phosphorous acid, phosphoric acid, alkali tungstates, and also alkali salts of weak acids, especially benzoic acid and butyl benzoic acid, and phenols, aliphatic, alicyclic and heterocyclic amines, alkanolamines, especially triethanolamine, and organosilicon compounds. Unfortunately, none of these compounds is effective on its own, so that it has been proposed to use mixtures of several components in definite ratios for practical application (German Patents Nos. 1,154,976 and 1,176,930, DAS No. 1,201,121).

The question of choice is met with difficulties from two different directions. On the one hand, it is not only one metal, but several different metals or alloys differing in their corrosion behaviour which have to be protected in a heat-transfer or cooling system, especially in motor vehicles. On the other hand, the individual corrosion inhibitors intervene differently in the process of corrosion with the result that they are not uniform in their protective effect on the various metals or alloys. Accordingly, it is necessary to select a mixture of individual corrosion inhibitors (DAS No. 1,201,121, Col. 1 lines 3 – 23).

It is also known that it is not possible to eliminate the unsatisfactory properties of a mixture simply by adding other inhibitors, and that, in practice, the favourable properties already obtained are often lost when other components are added (German Patent No. 1,154,976 Col. 1, line 49 to Col. 2, line 23)

Over recent years, the increasing use of aluminium alloys and the use of sealed cooling systems in motor vehicles have imposed more stringent requirements upon anticorrosives in the form of protection against corrosion for lightweight metal alloys and long-term activity. The addition of a nitrophenol, preferably of picric acid, has recently been proposed to meet the second of these two requirements (British Patent No. 1,221,996). None of the known agents affords the necessary protection against corrosion for lightweight metal alloys so that there is an obvious gap and a genuine need in their case (see Col. 1 lines 20–45 of the British patent).

It is also known that one particular difficulty in protecting metal castings against corrosion is that the chemical composition of the casting is not uniform throughout so that a conventional anticorrosive mixture has a totally different and, in many cases, inadequate effect on different parts of the casting. When a mixture of this kind is tested, the level of corrosion detected differs according to the place at which the sample was taken from the casting, and despite a basically satisfactory result of the mixture outliers are frequently detected in the negative sense.

Accordingly, there is considerable scope and an urgent need for improvements in the field of corrosion prevention in heat-transfer systems which use water as the heat-transfer medium.

SUMMARY

We have now found that the process for producing corrosion-inhibiting aqueous solutions and corrosion-inhibiting antifreeze agents on the basis of glycols and aqueous solutions thereof can be considerably improved by the addition to aqueous solutions and antifreeze agents already containing conventional corrosion inhibitors of heterocyclic nitrogen compounds corresponding to the the general formula:

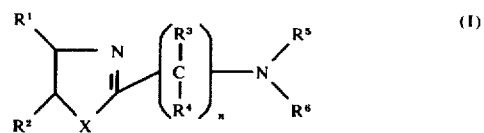

in which
 $R^1$ and $R^2$ represents hydrogen, or, together with the carbon atoms to which they are attached, form a benzene ring optionally substituted by a lower alkyl radical (preferably $C_1 - C_4$) halogen or a nitro group;
 $R^3, R^4, R^5$ and $R^6$ independently of one another represent hydrogen a lower alkyl radical having up to 6 C-atoms, a phenyl radical or a phenyl radical substituted by lower alkyl radicals having up to 6 C-atoms.
 X represents sulphur or an imino group (NH) optionally substituted on the nitrogen atom by a lower alkyl radical (preferably $C_1$–$C_4$), phenyl, or ω-amino alkyl ($C_2 - C_3$), preferably by methyl, phenyl or β-aminoethyl; and
 n is an integer in the range of from 1 to 13.

Alkyl radicals ($R^3$ to $R^6$) include linear or branched alkyl radicals having up to 6 and preferably up to 4 carbon atoms, for example the methyl-, ethyl-, propyl-, isopropyl, butyl-, isobutyl- and tert.-butyl-radical. The methyl and the ethyl radical represent preferred alkyl radicals.

The phenyl radicals ($R^3$ to $R^6$) can be substituted by lower alkyl groups.

DESCRIPTION

The following are mentioned as examples of compounds corresponding to formula I: Δ²-2-(ε-aminopentyl)-imidazoline, Δ²-1-(β-aminoethyl)-2-(ε-aminopentyl)-imidazoline, Δ²-2-(ε-aminopentyl)-thiazoline, 2-(β-amino-β-methyl-propyl)-benzimidazole, 2-(δ-aminobutyl)-benzimidazole, 2-(ε-aminopentyl)-benzimidazole, 2-(λ-aminoundecyl)-benzimidazole, 2-(ε-methylaminopentyl)-benzimidazole, 2-(ε-aminopentyl)-1-phenyl benzimidazole, 2-(ε-aminopentyl)-5-methyl benzimidazole, 2-(γ-phenylaminopropyl)-5-methyl benzimidazole, 2-(γaminopropyl)-benzthiazole, 2-(β-amino-β-methyl propyl)-benzthiazole, 2-(ε-amino pentyl)-benzthiazole, 2-(γ-methylaminopropyl)-benzthiazole, 2-(ε-dimethylamino pentyl)-benzimidazole.

Preferred compounds of general formula I are those compounds which correspond to the general formulae

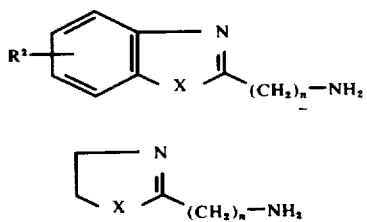

(II) and (III)

in which
X is as defined above; in the case of the radical NH the nitrogen atom can be substituted by a lower alkyl radical (preferably $C_{1-4}$), phenyl or ω-aminoalkyl ($C_{2-3}$), preferably by methyl, phenyl or β-aminoethyl;
$R^2$ represents hydrogen or an alkyl group having up to 6 and preferably having up to 4 carbon atoms, also phenyl; and
n is an integer in the range of from 1 to 11.

Particularly preferred compounds of general formula I are those compounds which contain an unbranched ω-aminoalkyl radical in position 2, in which case n represents 4, 5 or 6 whilst the ω-amino group can be alkylated either once or twice (cf. formulae (II) and (III) with n = 6, 5 or 4).

In general, the compounds of general formula I, are added to the aqueous solution in a quantity of from 0.0005 to 0.2% by weight, but preferably in a quantity of from 0.005 to 0.10% by weight, based on the total quantity of the aqueous solution.

Normally, the aqueous solutions containing corrosion inhibitors for glycols and triols, especially ethylene glycol and glycerol, more particularly for aqueous heat-transfer media optionally containing an antifreeze agent, are actually added to the glycol or triol, more particularly to the antifreeze agent, before the glycol or triol or antifreeze agent is diluted with water or added to the aqueous heat-transfer liquid. For this reason, the concentration of the corrosion inhibitor in the glycol or triol or antifreeze agent has to be higher in order to reach the above-mentioned concentrations in the aqueous solution. In general, the compounds of general formula I, are added to glycols or triols or antifreeze agents in quantities of from 0.001 to 0.4% by weight, but preferably in a quantity of from 0.01 to 0.2% by weight, based on the total quantity of glycol or antifreeze agent.

As already mentioned, an optimum corrosion-inhibiting or corrosion-preventing effect is achieved by adding not just one corrosion inhibitor, but a mixture of different corrosion inhibitors the composition of which can only be varied within certain limits. The term "anticorrosive" is used hereinafter for this mixture or corrosion-inhibitor system.

It has also been found according to the invention that the considerably improved effect of corrosion inhibitors known per se in the corrosion inhibiting aqueous solutions is obtained in particular when, as already mentioned, an anticorrosive is added to the aqueous solutions which contains the compounds of general formula I together with other corrosion inhibitors known per se and which has the following composition: 0.03 to 2% by weight of the compounds of general formula I

| 40 | to 80 % | by weight of | sodium benzoate |
|---|---|---|---|
| 4 | to 10 % | " | sodium nitrite |
| 5 | to 20 % | " | borax |
| 0 | to 20 % | " | soda |
| 2 | to 8 % | " | sodium nitrate and |
| 0.01 | to 2 % | " | sodium silicate. |

In the above-mentioned compounds, the sodium ion can be replaced either completely or in part by other alkali metal ions, for example by lithium or potassium ions. For example, it is also possible to use potassium benzoate, potassium carbonate, potassium nitrite, potassium nitrate or corresponding lithium compounds. However, sodium compounds and sodium benzoate are generally preferred to other alkali metal ions and substituted benzoate ions on economic grounds.

The borax content of the anticorrosive described above can also be increased up to 25% by weight in order to obtain greater reserve alkalinity. However, this generally has no effect upon the corrosion-preventing effect, especially in the case of aluminium alloys.

In general, this anticorrosive is added to aqueous, water-glycol and glycerol-water solutions in a quantity of from 0.75 to 3% by weight, and to antifreeze agents in a quantity of from 1.5 to 15% by weight, based in each case on the total quantity of the solution and the antifreeze agent respectively. In this way, the aforementioned content of 0.0005 to 0.2% by weight of the compounds of general formulae I to III is obtained in the resulting corrosion-inhibiting aqueous solution.

However, an anticorrosive of the following composition is preferred: 0.2 to 1% by weight of a compound of general formula I

| 60 | to 80 % | by weight of | sodium benzoate |
|---|---|---|---|
| 6 | to 8 % | " | sodium nitrite |
| 5 | to 15 % | " | borax |
| 0 | to 10 % | " | soda |
| 4 | to 7 % | " | sodium nitrate |
| 0.05 | to 1 % | " | sodium silicate. |

In general, this anticorrosive is added to the aqueous solution in a quantity of from 1.4 to 2.4% by weight, and to the antifreeze agent in a quantity of from 3 to 10% by weight, based in each instance upon the total quantity of the aqueous solution and the antifreeze respectively. It is thus possible to obtain the aforementioned preferred concentration of the compound of general formulae I to III of 0.005 to 0.1% by weight of the aqueous, glycol-water and glycerol-water solution, and of 0.01 to 0.3% by weight of the antifreeze agent.

It can, of course, be advantageous to convert the anticorrosive according to the invention, which as such is only a blend or mixture into the form of an anticorrosive pack, concentrate or solution in order to facilitate filling and packing for marketing purposes and to facilitate handling of the anticorrosive before it is actually used in accordance with the invention.

It is advantageous to use solvents which are miscible with water or with an aqueous solution containing glycols, especially ethylene glycol, or triols, especially glycerol. It is preferred to use water itself and/or glycols, especially ethylene glycol. The concentration of the anticorrosive in these concentrated solutions is unimportant, although it is best selected so that the final concentration according to the invention of the anticorrosive in the heat-transfer liquid is obtained by mixing this initial solution either with water or with an aqueous solution containing glycols in a suitable mixing ratio. A mixing ratio corresponding to a simple, integral numerical ratio is normally selected for this purpose. For example, this initial solution can have a concentration between 2 to 100 times higher than that of the heat-transfer liquid.

In order to use the anticorrosive in the aforementioned initial solutions and in the corrosion-inhibited aqueous solutions and glycol-based antifreeze agents and their aqueous solutions prepared with these initial solutions, it can be advantageous to use the anticorrosive in the form of a solid mixture of the various individual inhibitors. In this connection, it is possible to obtain a homogeneous, non-hygroscopic anticorrosive in flake or powder form with hardly any losses, for example by preparing the anticorrosive from a concentrated aqueous solution by spray drying or spray/cylinder drying at temperatures in the range of from 150° to 250° C. These drying techniques are prior art, can be carried out in various, known ways and optionally influence the properties of the anticorrosive, for example dissolution rate in solvents such as glycol, apparent density and compressibility (into tablets). These influences or dependencies are generally known or can be determined through a few tests. With this form of drying, it is possible for the compounds borax and soda containing water of crystallisation in the anticorrosive to be replaced by disodium tetraborate and sodium carbonate, so that the anticorrosive according to the invention can also have the following composition:

0.03 to 2% by weight of the compounds of general formula I:

| 40 | to 80 % | by weight of | sodium benzoate |
|---|---|---|---|
| 4 | to 10 % | " | sodium nitrite |
| 2 | to 12 % | " | disodium tetraborate |
| 0 | to 9 % | " | sodium carbonate |
| 2 | to 8 % | " | sodium nitrate and |
| 0.01 | to 2 % | " | sodium silicate. |

The preferred anticorrosive can also have the following composition:
0.2 to 1% by weight of a compound of general formula I:

| 60 | to 80 % | by weight of | sodium benzoate |
|---|---|---|---|
| 6 | to 8 % | by weight of | sodium nitrite |
| 3 | to 9 % | " | disodium tetraborate |
| 0 | to 4 % | " | sodium carbonate |
| 4 | to 7 % | " | sodium nitrate |
| 0.05 | to 1 % | " | sodium silicate |

In addition to the aforementioned contents of anhydrous substances and substances free from any water of crystallisation, the above-mentioned anticorrosives can then contain up to 20% by weight of water and/or water of crystallisation, based on the sum total of the anhydrous constituents.

In general, a solution of this kind, from which a solid anticorrosive is to be produced, for example by spray drying, is prepared as follows: the individual constituents are dissolved in any order in distilled water either at normal temperature or at elevated temperature (for example 50° C). If desired, individual constituents can even be added in the form of solutions. In general, the water content and/or water of crystallisation content of the anticorrosive after drying fluctuates according to the drying conditions. However, it is possible by maintaining the same drying conditions to keep this water and/or water of crystallisation content at the same level. The content of compound of formula I is generally always reproducibly the same as well, because these compounds have such a low vapour pressure that they do not vaporise during drying.

For heat-transfer systems (for example motor vehicle radiators) which can cool to below freezing point, an antifreeze agent has to be added to the water, in other words it is essential to use aqueous solutions containing glycols as heat-transfer medium. The requisite quantities of corrosion inhibitors or anticorrosives are normally added to the antifreeze agents themselves. The concentration of the anticorrosive in the antifreeze agent is best adjusted in dependence upon the prescribed mixing ratio of the antifreeze agent with water. For example, it is possible by adding 1 part by volume of ethylene glycol to four to one part by volume of water, to lower the freezing point to between −9° and −36° C. In central Europe, it is preferred to use one part of antifreeze agent based on glycols, especially ethylene glycol, to two parts of water. As a result, the anticorrosive is added to the antifreeze agent in twice to five times the quantity, more particularly in 2.5 to 3 times the quantity, which the resulting aqueous heat-transfer liquid incorporating the antifreeze agent is intended to contain.

The compounds (I) used in accordance with the invention can also be added to the aqueous sump phase in order to prevent internal corrosion in fuel-oil tanks. In this case, the stabilisers are added in quantities of from 500 to 2,000 ppm and preferably in quantities of from 800 to 1,600 ppm. The alkali benzoates used for cooling systems are replaced in the case of fuel-oil tanks by water-soluble ethanolamine salts, preferably triethanolamine salts, triethanolamine being present in excess (100 to 500%, based on benzoic acid). The way in which the compounds (I) used for the process according to the invention are employed is described in the following.

For example, an antifreeze agent based on glycols, especially ethylene glycols, contains 1.5 to 15 parts by weight of an anticorrosive preferably consisting of 0.2 to 1.0% by weight of a compound of general formula I

| 60 | to 80 % | by weight of | sodium benzoate |
|---|---|---|---|
| 6 | to 8 % | " | sodium nitrite |
| 5 | to 15 % | " | borax |
| 0 | to 10 % | " | soda |
| 4 | to 7 % | " | sodium nitrate |
| 0.05 | to 1 % | " | sodium silicate |

An antifreeze agent based on glycols, particularly ethylene glycols, preferably contains from 2 to 10% by weight of this anticorrosive.

One particularly preferred antifreeze agent consists of 5% by weight of anticorrosive and of 95% by weight of glycols. Two particularly preferred anticorrosives have the following composition: 0.5% by weight of a compound of general formulae 1,

|  | 1) | | 2) | |
|---|---|---|---|---|
| sodium benzoate | 78.75 | % by weight | 66.25 | % by weight |
| sodium nitrite | 7.8 | " | 6.65 | " |
| borax | 7.0 | " | 13.8 | " |
| soda | — | | 7.85 | " |
| sodium silicate | 0.05 | " | 0.05 | " |
| sodium nitrate | 5.9 | " | 4.9 | " |

In general, 1 part by volume of the antifreeze agent is diluted with 2 parts by volume of water to prepare an aqueous heat-transfer liquid. In this way, it is possible to reduce the freezing point of the aqueous solution to an extent that is adequate for central European winter temperatures. In other regions, dilution with the lighter or heavier according to the winter temperatures prevailing. If the antifreeze agent is intended to be used solely in an abnormal dilution such as this, other contents of corrosion inhibitors or anticorrosives in the antifreeze agent may also be preferred. In this case, the preferred contents can readily be calculated from the preferred content of corrosion inhibitors of general formula I or anticorrosives in the corrosion-inhibiting antifreeze-containing aqueous solution. The conversion factors required for this purpose are known: dilution ratio densities of water, ethylene glycols and aqueous solutions containing ethylene glycol (cf. for example Am. Soc. 65, 13096 (1943), percentage composition of the anticorrosive.

The superiority of the new corrosion inhibitors of general formula according to the invention and of the anticorrosives containing them to conventional corrosion inhibitors and corrosion-inhibitor combinations is demonstrated by the following Examples.

At the same time, tests conducted in accordance with ASTM Designation: D 1384-65, the Standard of the American Society for Testing and Materials, which is generally recognized for testing corrosion inhibitors, especially in antifreeze agents, demonstrate the superiority of the corrosion inhibitors, anticorrosives, antifreeze agents and of the corrosion-inhibited aqueous solutions according to the invention, in conjunction with the following Examples.

The test was expanded in 5 respects:

1. Synthetically prepared water with a total (German) hardness of 20° and two urban tap waters were used in addition to the corrosive water prescribed in ASTM D 1384-65.

2. On account of the increasing importance of aluminium alloys, a metal "package" (the metal specimen arrangement) expanded by one aluminium alloy or by two or three other aluminium alloys, was frequently used in addition to the prescribed metals in a second test, metal spaces being used accordingly.

3. Since a temperature above 71° C frequently prevails in aqueous heat-transfer media, tests were also conducted at 95° C. The temperature of 71° C is prescribed in ASTM D 1384-65.

4. The 14-day test prescribed by the ASTM generally provides inadequately differentiated results. In order to determine the long-term effect of anticorrosives, we considered it necessary to carry out 120-day tests as well because in this way we were able to assess pitting, especially in the case of lightweight metals.

5. In order to demonstrate the superiority of the corrosion inhibitors and anticorrosives according to the invention in the case of purely aqueous solutions as well, of the kind used in heat-transfer systems, for example central heating systems, the ASTM test was modified in a number of experiments to the extent that a pure aqueous solution was used and the prescribed metal "package" was expanded by aluminium alloys of the kind specially used in radiator construction.

The comparison tests were carried out with antifreeze agents containing corrosion inhibitors in accordance with British Standards 3150; 1959, 3151; 1959 and 3152: 1959, of the British Standards Institution, and standard commercial antifreeze agents.

In the presence of the compounds of general formulae I to III, substituted benzoic acid such as m-, p-chloro-, o-, m-, p-nitro, m-, p-methyl benzoic acids, in the form of amine salts and/or without sodium nitrite, are suitable for preventing corrosion inside oil tanks in accordance with the tests described below. The following aqueous anticorrosive concentrates are recommended, being added to the oil tanks in quantities in the range of from 10 to 200 ppm, but preferably in quantities of from 50 to 100 ppm, based on the quantity of oil, over a period of 1 year:

| 2 to 10 % by weight of | substances of general formula 1 |
| 20 to 50 % " | triethanolamine |
| 5 to 20 % " | substituted benzoic acid |
| 0 to 50 % " | sodium nitrite |
| | remainder water, | but preferably:

| 6 to 8 % by weight of | 2-($\epsilon$-aminopentyl)-benzimidazole or 2-($\epsilon$-aminopentyl)-benzothiazole |
| 6 to 12 % " | o-, m- or p-toluic acid |
| 30 to 50 % " | triethanolamine |
| 20 to 50 % " | sodium nitrite |
| | remainder water |

Artificial sea water according to DIN 50 900 was used in the Stoffels test (cf. Technische Uberwachung, Vol. 2, page 342 (1961):

28 g of sodium chloride
7 g of magnesium sulphate $MgSO_4 \cdot 7 H_2O$
5 g of magnesium chloride $MgCl_2 \cdot 6 H_2O$
2.4 g of calcium chloride $CaCl_2 \cdot 6 H_2O$
0.20 g of sodium hydrogen carbonate
985 g of water.

EXAMPLES

Testing in accordance with ASTM Designation:D 1384–65 was carried out with a mixture of 1 part by volume of antifreeeze agent and 2 parts by volume of water of the following quantity:

a. water of 20° total (German) hardness (1° German hardness = 17,85 ppm $CaCO_3$ as 357 ppm $CaCO_3$) produced from distilled water by adding

| | | | | | | |
|---|---|---|---|---|---|---|
| CaCl₂ corresponding | to | 2.5° | of | German | NKH | ≙ 44,625 ppm CaCO₃ |
| CaSO₄ " | " | 2.5° | " | " | " | ≙ 44,625 ppm CaCO₃ |
| MgSO₄ " | " | 2.5° | " | " | " | ≙ 44,625 ppm CaCO₃ |
| MgCl₂ " | " | 2.5° | " | " | " | ≙ 44,625 ppm CaCO₃ |
| Ca(HCO₃)₂ " | " | 7.5° | " | " | KH | ≙ 133,875 ppm CaCO₃ |
| Mg(HCO₃)₂ " | " | 2.5° | " | " | KH | ≙ 44,625 ppm CaCO₃ |

NKH = non-carbonate hardness (temporary hardness)
KH = carbonate hardness (permanent hardness)
b. corrosive water according to ASTM D 1384–65. 148 mg of Na₂SO₄, 165 mg of NaCl and 138 mg of NaHCO₃ are dissolved in 1000 g of distilled water.

| c) urban tap water Krefeld | d) urban tap water Leverkusen |
|---|---|
| 66 mg Cl⁻/l | 201 mg Cl⁻/l |
| 116mg SO₄²⁻/l | 106 mg SO₄²⁻/l |
| 10.3° German KH ≙ 183,9 ppm CaCO₃ | 7.6° German KH = 135,7 ppm CaCO₃ |
| 18.3° German NKH ≙ 326.7 ppm CaCO₃ | 8.0° German NKH = 142,8 ppm CaCO₃ |

Thus, exemplary corrosion-inhibiting aqueous solutions according to the invention are obtained, containing the corrosion inhibitors of general formulae according to the invention in a concentration of from 0.003 to 0.07% by weight.

The optionally expanded metal "package" contained the following metals and metal alloys:

| | | |
|---|---|---|
| 1. | copper SF-Cu | see also ASTM D 1384–65 |
| 2. | soft solder containing 33 % of Sn | and Werkstofftabellen |
| 3. | brass Ms 63, semi hard | der Metalle, Alfred |
| 4. | steel ST 37, twice-pickled | Kroner-Verlag, |
| 5. | grey iron GGL 15 | Stuttgart, 7th |
| 6. | Silumin G Al Si6 Cu4 | Edition 1972 |
| 7. | Al Si12 | |
| 8. | AlMn | |
| 9. | Al Zn1 | |
| 10. | Al Mg Si 0.5 | |
| 11. | Al Mg 4.5 Mn | |

The results of tests conducted with these exemplary corrosion-inhibiting aqueous solutions and hence with the antifreeze agents as well, are set out in Table I in the following manner: in the column headed "Example" the first number denotes the exemplary antifreeze agent or anticorrosive, the small letter denotes the water used, and the following number 1 denotes corresponding tests conducted with an expanded metal specimen arrangement in the column headed "metals", the numbers denote the metals or metal alloys corresponding to the above list.

The figures quoted in the Table indicate the weight losses found, converted into g/m².

The preceding explanation applies to all other Tables as well.

EXAMPLES 1 to 8

Antifreeze agents of the following composition were used in these Examples:

| | | |
|---|---|---|
| 94.05 % | by weight of | monoethylene glycol |
| 4.0 % | " | sodium benzoate |
| 0.65 % | " | soda |
| 0.35 % | " | borax |
| 0.40 % | " | sodium nitrite |
| 0.30 % | " | sodium nitrite |
| 0.05 % | " | sodium silicate |

0.03 to 0.2% by weight of a compound of general formula (if the I to III-content is less than 0.2% by weight, the monoethylene glycol content increases accordingly) in accordance with the following list:

| | | |
|---|---|---|
| Example 1: 0.2 % | by weight of | 2-(ε-aminopentyl)-benzimidazole |
| Example 2: 0.1 % | " | 2-(ε-aminopentyl)-benzimidazole |
| Example 3: 0.03 % | " | 2-(ε-aminopentyl)-benzimidazole |
| Example 4: 0.2 % | " | 2-(ε-aminopentyl)-benzimidazole |
| Example 5: 0.2 % | " | 1-(β-aminoethyl)-2-(ε-aminopentyl)-imidazoline |
| Example 6: 0.2 % | " | 2-(ε-aminopentyl)-imidazoline |
| Example 7: 0.2 % | " | 2-(β-amino-β-methylpropyl)-benzimidazole |
| Example 8: 0.2 % | " | 2-(β-amino-β-methylpropyl)-benzthiazole |

In Examples 2 and 3, the content of monoethylene glycol amounts to 94.15 to 94.22% by weight, respectively.

The results obtained from these tests are set out in the following Table.

Table I

| Example No. | Metal No. | | | | | | | | |
|---|---|---|---|---|---|---|---|---|---|
| | 1 | 2 | 3 | 4 | 5 | 6 | 7 | 8 | 9 |
| 1 b | 2.3 | −0.1 | 0.8 | −0.3 | 4.5 | 1.8 | | | |
| 1 b 1 | −1.5 | −1.1 | 1.9 | 0.3 | 1.1 | 0.2 | −0.4 | | |
| 2 a | 3.7 | 1.3 | 0.7 | −0.4 | −1.1 | 1.2 | | | |
| 2 b | 1.6 | −0.8 | 2.3 | 0.0 | −0.8 | −1.2 | | | |
| 3 a | 0.6 | 0.1 | −0.2 | 0.1 | 1.0 | 0.2 | | | |
| 3 b | 0.0 | −0.4 | −0.3 | 0.3 | 0.6 | −0.8 | | | |
| 3 c | −0.1 | 0.8 | −0.1 | 0.9 | 1.6 | −0.3 | | | |
| 3 a 1 | −0.1 | −0.1 | 0.1 | 1.0 | 1.6 | −0.9 | −0.6 | −0.9 | −0.1 |
| 3 b 1 | 0.2 | 0.1 | −0.8 | 0.6 | 1.8 | −1.0 | −0.6 | −0.6 | 0.2 |
| 3 c 1 | −0.4 | −0.3 | 0.2 | 0.9 | 1.1 | −1.1 | −0.7 | −1.2 | −0.5 |
| 4 b | 2.1 | 0.7 | 0.0 | 0.5 | 3.1 | 0.4 | | | |
| 4 b 1 | 1.1 | −1.4 | 1.2 | 0.5 | −0.6 | 2.2 | −0.4 | | |
| 5 b | 6.9 | −0.2 | 0.6 | 0.2 | 4.3 | 1.1 | | | |
| 6 b | 5.0 | 1.6 | 2.1 | 0.5 | 4.9 | 0.5 | | | |
| 7 b 1 | 1.5 | 2.5 | 0.2 | −0.2 | 0.1 | 0.3 | 1.9 | 4.4 | 16.4 |
| 8 b 1 | 0.6 | 0.4 | −0.9 | −0.3 | −0.6 | 0.5 | 1.7 | 0.9 | 12.6 |

The number 1 added after 3 *a* etc. denotes the metal specimen arrangement expanded by aluminium alloys in relation to the chain prescribed by the ASTM.

EXAMPLES 9 to 16

Antifreeze agents of the following composition were used in these Examples: 95% by weight of monoethylene glycol and 5% by weight of an anticorrosive of the following composition:

| 66.25 % | by weight of | sodium benzoate |
|---|---|---|
| 6.65 % | " | sodium nitrite |
| 13.8 % | " | borax |
| 7.85 % | " | soda |
| 0.05 % | " | sodium silicate |
| 4.9 % | " | sodium nitrate |
| 0.5 % | " | of a compound corresponding to | general formula I, in accordance with the following list:

Example 9: 2-(γ-aminopropyl)-benzimidazole
Example 10: 2-(λ-aminoundecyl)-benzimidazole
Example 11: 2-(ε-aminopentyl)-5-methyl benzimidazole
Example 12: 2-(β-amino-β-methyl propyl)-benzimidazole
Example 13: 2-(β-amino-β-methyl propyl)-benzothiazole
Example 14: 2-(ε-methylaminopentyl)-benzimidazole
Example 15: 2-(δ-aminobutyl)-benzimidazole
Example 16: 2-(ε-aminopentyl)-benzimidazole The test results obtained are set out in the following Table:

Table II

| Example No. | Metal No. | | | | | | | | |
|---|---|---|---|---|---|---|---|---|---|
| | 1 | 2 | 3 | 4 | 5 | 6 | 7 | 8 | 9 |
| 9 b | 1.1 | 2.0 | 2.4 | −0.2 | 16.5 | 3.0 | | | |
| 10 b | 1.4 | 3.4 | 2.8 | 1.2 | 13.0 | 3.8 | | | |
| 11 b | 1.2 | 3.8 | 2.3 | −0.2 | 11.9 | 2.7 | | | |
| 12 b | 1.4 | 2.2 | 1.0 | 1.5 | 14.2 | 1.8 | | | |
| 13 b | 1.6 | 4.1 | 1.6 | 1.9 | 12.9 | 2.5 | | | |
| 14 b | 1.4 | 6.0 | 1.8 | 1.9 | −2.2 | 2.8 | | | |
| 15 b | 1.3 | 2.4 | 3.0 | 1.9 | 17.5 | 2.6 | | | |
| 16 b | 0.0 | 2.0 | 0.4 | −0.3 | 0.6 | 1.6 | | | |

EXAMPLES 17 to 25

Antifreeze agents of the following composition were used in these Examples: 95% by weight of monoethylene glycol and 5% by weight of an anticorrosive of the following composition:

| 66.25 | % | by weight of | sodium benzoate |
|---|---|---|---|
| 6.65 | % | by weight of | sodium nitrite |
| 13.8 | % | by weight of | borax |
| 7.85 | % | by weight of | soda |
| 0.05 | % | by weight of | sodium silicate |
|  | | by weight of | sodium nitrate |
| 0.5 | % | by weight of | 2-(ε-aminopentyl)-benzimidazole, | the sodium benzoate being replaced by equivalent parts by weight of related salts in accordance with the following list:

Example 17: potassium benzoate
Example 18: lithium benzoate
Example 19: sodium-m-tolylate
Example 20: sodium-p-tolylate
Example 21: sodium-p-chlorobenzoate
Example 22: sodium-m-nitrobenzoate
Example 23: sodium-p-nitrobenzoate
Example 24: sodium trichlorobenzoate
Example 25: sodium-p-tert.-butylbenzoate The test results obtained are set out in the following Table:

Table III

| Example No. | Metal No. | | | | | |
|---|---|---|---|---|---|---|
| | 1 | 2 | 3 | 4 | 5 | 6 |
| 17 b | 1.0 | 2.9 | 2.6 | 2.8 | 12.5 | 2.3 |
| 18 b | 1.0 | 2.0 | 3.0 | 1.5 | 14.6 | 2.5 |
| 19 b | 1.2 | 3.5 | 2.7 | 1.6 | 13.4 | 2.5 |
| 20 b | 2.2 | 2.2 | 2.2 | 1.9 | 13.6 | 2.5 |
| 21 b | 1.2 | 6.2 | 2.4 | 1.4 | 11.6 | 3.7 |
| 22 b | 1.4 | 3.0 | 1.2 | 0.8 | 13.3 | 1.1 |
| 23 b | 1.0 | 3.8 | 2.0 | 1.7 | 14.4 | 7.5 |
| 24 b | 1.2 | 3.8 | 3.3 | 1.6 | 13.0 | 6.1 |

Table III-continued

| Example No. | Metal No. | | | | | |
|---|---|---|---|---|---|---|
| | 1 | 2 | 3 | 4 | 5 | 6 |
| 25 b | 1.2 | 2.4 | 2.5 | 0.6 | 12.0 | 1.5 |

EXAMPLES 26 to 34

1.65% of weight of an anticorrosive with the same composition as in Examples 17 to 25 in water was used in these Examples.
Example 26: sodium-m-tolylate
Example 27: sodium-p-tolylate
Example 28: sodium-p-chlorobenzoate
Example 29: sodium-o-nitrobenzoate
Example 30: sodium-m-nitrobenzoate
Example 31: sodium-p-nitrobenzoate
Example 32: sodium trichlorobenzoate
Example 33: sodium-p-tert.-butylbenzoate
Example 34: sodium benzoate The test results obtained are set out in the following Table.

Table IV

| Example No. | Metal No. | | | | | | | | |
|---|---|---|---|---|---|---|---|---|---|
| | 1 | 2 | 3 | 4 | 5 | 6 | 7 | 8 | 9 |
| 26 b | 1.5 | 2.9 | 3.0 | 1.6 | 3.6 | 3.9 | | | |
| 27 b | 1.4 | 4.4 | 2.5 | −0.1 | −0.2 | 9.5 | | | |
| 28 b | 2.2 | 2.8 | 2.7 | −0.4 | 2.3 | 5.9 | | | |
| 29 b | 1.9 | 2.5 | 4.4 | 1.1 | 5.5 | 12.7 | | | |
| 30 b | 1.0 | 6.3 | 3.4 | 1.0 | 1.9 | 12.5 | | | |
| 31 b | 1.0 | 4.6 | 1.8 | 1.5 | 2.1 | 7.7 | | | |
| 32 b | 1.2 | 4.8 | 1.8 | 0.6 | 1.2 | 17.6 | | | |
| 33 b | 1.1 | 6.6 | 3.7 | 1.2 | 2.1 | 14.9 | | | |
| 34 b | 0.0 | 1.4 | 0.0 | −0.4 | −1.5 | 0.7 | | | |
| 34 c 1 | −0.8 | 0.8 | −1.0 | 0.2 | −0.7 | −1.1 | −1.1 | −0.4 | −1.1 |

EXAMPLES 35 and 36

1.65% by weight of an anticorrosive with the same composition as in Examples 9 to 16 in water was used in these Examples:
Example 35: 2-(ε-aminopentyl)-5-methyl benzimidazole
Example 36: 2-(δ-aminobutyl)-benzimidazole.

The test results obtained are set out in the following Table:

Table V

| Example No. | Metal No. | | | | | |
|---|---|---|---|---|---|---|
| | 1 | 2 | 3 | 4 | 5 | 6 |
| 35 b | 1.1 | 2.7 | 5.0 | 1.8 | 8.1 | 6.4 |
| 36 b | 1.6 | 4.5 | 3.6 | 0.6 | 1.8 | 6.2 |

EXAMPLES 37 and 38

In these Examples, 1.65% by weight of an anticorrosive with the same composition as in Examples 17 to 25 were used in 98.35% by weight of a mixture of glycerol and water (1 : 2):
Example 37: sodium benzoate
Example 38: sodium-p-tert.-butylbenzoate The test results obtained are set out in the following Table.

Table VI

| Example No. | Metal No. | | | | | |
|---|---|---|---|---|---|---|
| | 1 | 2 | 3 | 4 | 5 | 6 |
| 37 b | 2.5 | 4.7 | 2.6 | 3.0 | 3.4 | 5.4 |
| 38 b | 2.0 | 2.5 | 2.9 | 1.4 | 1.1 | 13.3 |

EXAMPLES 39 and 40

These Examples were carried out in accordance with Examples 16 and 34. The anticorrosive had the following composition:

| | | | |
|---|---|---|---|
| 78.75 | % | by weight of | sodium benzoate |
| 7.8 | % | by weight of | sodium nitrite |
| 7.0 | % | by weight of | borax |
| 0.05 | % | by weight of | sodium silicate |
| 5.9 | % | by weight of | sodium nitrate |
| 0.5 | % | by weight of | 2-(ε-aminopentyl)-benzimidazole |

Example 39: as Example 16
Example 40: as Example 34

The test results obtained are set out in the following Table:

Table VII

| Example No. | Metal No. | | | | | |
|---|---|---|---|---|---|---|
| | 1 | 2 | 3 | 4 | 5 | 6 |
| 39 b | 0.7 | 0.5 | 0.0 | 0.4 | 1.1 | 0.7 |
| 40 b | 0.3 | 2.4 | 0.4 | −0.2 | 18.0 | 2.7 |

Comparison Examples A to C:

Comparison Examples A to C were also carried out with three different solutions each prepared with the water described under a,b and c. The metal specimen arrangements described in Examples 1 to 40 were also used for comparison Examples A to C.

Example A:
Antifreeze solution with corrosion inhibitor according to British Standard 3152: 1959: 1 part by volume of ethylene glycol containing 2.5% by weight of borax diluted with 2 parts by volume of water.

Example B:
Antifreeze solution with corrosion inhibitor according to British Standard 3150: 1959: 1 part by volume of glycol containing 3.5% by weight of triethanolamine phosphate and 0.25% by weight of sodium mercaptobenzothiazole, diluted with 2 parts by volume of water.

Example C:

Antifreeze solution with corrosion inhibitor according to British Standard 3151: 1959: 1 part by volume of glycol containing 5.0% by weight of sodium benzoate and 0.5% by weight of sodium nitrite, diluted with 2 parts by volume of water.

The test results obtained are set out in Table VIII, the particulars in the Table having the same meaning as the particulars in the preceding Tables.

Example III

Standard antifreeze agent containing
2.4% of sodium benzoate,
0.15% of sodium nitrite,
 borax,
 nitrogen-containing organic substance.

Table VIII

| Example No. | Metal No. | | | | | | | | |
|---|---|---|---|---|---|---|---|---|---|
|  | 1 | 2 | 3 | 4 | 5 | 6 | 7 | 8 | 9 |
| A a | 2.0 | 53.0 | 2.0 | 45.0 | 91.3 | 6.3 | | | |
| A b | 1.0 | 86.6 | 0.6 | 3.5 | 165.7 | 9.1 | | | |
| A c | 0.1 | 76.0 | 1.4 | 16.8 | 115.0 | 10.5 | | | |
| A a 1 | 0.4 | 58.5 | 3.0 | 7.4 | 77.0 | 2.0 | 0.6 | 2.0 | 99.0 |
| A b 1 | 0.2 | 209.3 | 2.8 | 1.9 | 96.8 | 1.4 | −0.7 | 1.9 | 125.3 |
| A c 1 | 0.4 | 117.1 | 2.8 | 1.6 | 86.8 | 2.4 | 1.0 | 1.8 | 117.7 |
| B a | 1.4 | 0.3 | 1.4 | 1.4 | 21.0 | 2.0 | | | |
| B b | 1.6 | 0.5 | 2.3 | 6.4 | 15.9 | 16.4 | | | |
| B c | 0.6 | −0.5 | 1.8 | 7.7 | 19.0 | 2.7 | | | |
| B a 1 | 1.5 | −0.9 | 2.2 | 4.4 | 21.7 | −0.3 | −0.4 | 0.4 | 0 |
| B b 1 | 0.8 | 0 | 2.8 | 4.0 | 20.1 | −0.3 | −0.8 | 0.5 | 4.4 |
| B c 1 | 1.0 | −0.4 | 1.1 | 10.5 | 45.0 | −0.6 | −0.4 | 0.7 | 1.2 |
| C a | 3.0 | −0.2 | 0.9 | −0.3 | −0.2 | 0.6 | | | |
| C b | 2.6 | −0.2 | 0.8 | −0.4 | 1.6 | 10.5 | | | |
| C c | 3.3 | 0.4 | 2.0 | −0.2 | 0.6 | 8.6 | | | |
| C a 1 | 0.6 | 0.6 | 0.3 | −0.6 | 0 | 1.1 | −0.1 | 1.3 | 0.8 |
| C b 1 | 3.4 | 0.8 | 0.6 | −1.2 | −0.1 | 2.3 | 2.4 | 1.2 | 17.4 |
| C c 1 | 6.2 | 1.2 | 1.5 | 0.5 | −0.2 | 0.3 | 0.2 | 1.2 | 5.1 |

Comparison tests I to IV

Four standard antifreeze agents used in the winter of 1970 to 1971, whose primary constituents were determined by qualitative and, to some extent, quantitative analysis, were used for comparison tests I to IV.

Example I

Antifreeze agent containing
4.1% of sodium benzoate,
0.33% of sodium nitrite,
 borax,
 sodium silicate.

Example II

Standard antifreeze agent containing
2.2% of sodium benzoate,
0.27% of sodium nitrite,
 borax,
 sodium nitrate,
 sodium silicate,
 organic nitrogen-containing substance.

Example IV

Standard antifreeze agent containing
0.05% of sodium nitrite,
3.5% of borax,
 sodium silicate.

The comparison tests were carried out in the same way as in Examples 1 to 40 and A to C. The results are shown in the following Table (Table IX), in which the designations have the same meaning as in Examples 1 to 40 and A to C.

In the interests of a more effective comparison, two tests of Example 3 are also included in the Table.

Table IX

| Example No. | Metal No. | | | | | | | | |
|---|---|---|---|---|---|---|---|---|---|
|  | 1 | 2 | 3 | 4 | 5 | 6 | 7 | 8 | 9 |
| 3 b | 0.0 | −0.4 | −0.3 | 0.3 | 0.6 | −0.8 | | | |
| 3 b 1 | 0.2 | 0.1 | −0.8 | 0.6 | 1.8 | −1.0 | −0.6 | −0.6 | 0.2 |
| I b | 4.3 | 2.5 | 4.0 | 4.0 | 18.5 | 0.5 | | | |
| I b 1 | 1.2 | 5.2 | 1.7 | 1.6 | 29.1 | 0.5 | 2.3 | 2.0 | 5.1 |
| II b | 1.5 | 0.5 | 3.0 | 3.0 | 25.0 | 1.0 | | | |
| II b 1 | 1.2 | 0 | 1.7 | 0.6 | 9.9 | 1.6 | 0.4 | 2.4 | 5.6 |
| III b | 2.0 | 2.0 | 1.5 | 1.0 | 2.0 | 8.5 | | | |
| III b 1 | 1.7 | 1.1 | 1.6 | 2.2 | 5.9 | 12.1 | 2.5 | 2.1 | 12.4 |
| IV b | 5.1 | 2.8 | 3.9 | 3.5 | 3.0 | 4.0 | | | |
| IV b | 2.6 | 4.9 | 2.7 | 0.6 | 2.1 | 4.0 | 5.4 | 4.6 | 8.9 |

EXAMPLES 41 to 44

Examples 41 to 44 were carried out in the same way as Examples 16, 34, 39 and 40. The test temperature was 95° C.

Example 41: corresponds to Example 16
Example 42: corresponds to Example 34
Example 43: corresponds to Example 39
Example 44: corresponds to Example 40.

The test results obtained are set out in the following Table:

Table X

| Example No. | Metal No. 1 | 2 | 3 | 4 | 5 | 6 |
|---|---|---|---|---|---|---|
| 41 b | 0.8 | 0.8 | 1.3 | 0.9 | 0.9 | 1.8 |
| 42 b | 1.8 | 1.7 | 1.5 | 1.8 | 1.8 | 4.0 |
| 43 b | 4.2 | 2.2 | 1.3 | 0.9 | 1.3 | 1.9 |
| 44 b | 1.5 | 0.0 | 1.5 | 1.0 | 1.2 | 1.8 |

EXAMPLES 45 and 46

In these Examples, the test period was extended to 30 days. The anticorrosive was used in a concentration of 1.75% by weight.
Example 45: corresponds to Example 39
Example 46: corresponds to Example 40

Table XI

| Example No. | Metal No. 1 | 2 | 3 | 4 | 5 | 6 |
|---|---|---|---|---|---|---|
| 45 b | 0.8 | 2.2 | 0.8 | 1.9 | 4.1 | 1.9 |
| 46 b | 0.4 | 1.6 | 1.1 | 0.6 | 0.7 | 1.4 |

EXAMPLE 47

In this Example, the test period was extended to 12 weeks. The following antifreeze agent was used:

| 4.0 % | " | sodium benzoate |
|---|---|---|
| 0.4 % | " | sodium nitrite |
| 0.35 % | " | borax |
| 0.65 % | " | soda |
| 0.05 % | " | sodium silicate |
| 0.3 % | " | sodium nitrate |
| 0.01 % | " | 2-(ε-aminopentyl)-benzimidazole. |

The test results obtained are set out in the following Table:

Table XII

| Example No. | Metal No. 1 | 2 | 3 | 4 | 5 | 6 | 7 | 8 | 9 |
|---|---|---|---|---|---|---|---|---|---|
| 47 a | 8.2 | 0.0 | 7.3 | 2.8 | 3.9 | 0.8 | | | |
| 47 b | 7.9 | 2.1 | 6.0 | 3.4 | 2.3 | 1.2 | | | |
| 47 d | 5.9 | 5.5 | 2.8 | 4.3 | 0.0 | −1.4 | | | |
| 47 a 1 | 5.9 | 3.0 | 3.2 | 3.5 | 3.3 | 7.5 | 0.6 | 0.0 | 0.4 |
| 47 b 1 | 4.1 | 1.9 | 0.0 | 7.3 | 7.7 | 2.0 | −0.9 | −1.0 | 1.2 |
| 47 d 1 | 6.2 | 5.3 | 2.8 | 7.7 | 3.0 | 4.8 | 0.9 | −1.0 | 1.3 |

EXAMPLE 48 and Comparison Tests V to VIII

In Example 48 (antifreeze agent as in Example 3) and in the comparison tests, the test period was extended to 120 days. Otherwise these tests were carried out in the same way as in the preceding Examples. The following antifreeze agents were compared with one another.

Comparison Tests V to VIII

Four standard antifreeze agents used in the winter of 1970 to 1971, whose primary constituents were determined by qualitative and, to some extent, quantitative analysis, were used for comparison tests V to VIII.

Comparison test V was carried out with the same standard antifreeze agent as used in comparison test IV. Comparison test VI was carried out with the same standard antifreeze agent as used in comparison test I. Comparison test VII was carried out with the same standard antifreeze agent as used in comparison test II. Comparison test VIII was carried out with the same standard antifreeze agent as used in comparison test III.

The test results obtained are set out in the following Table.

Where several figures are quoted under one Example number in this and other Tables, they represent the results of independent parallel tests.

Table XIII

| Example No. | Metal No. 1 | 2 | 3 | 4 | 5 | 6 | 7 | 8 | 10 |
|---|---|---|---|---|---|---|---|---|---|
| 48 a 1 | 0.8 | 4.0 | 0.6 | 1.8 | 4.8 | −3.0 | −2.6 | 1.0 | −1.0 |
|  | 0.0 | 3.3 | 0.2 | −1.3 | −0.4 | −1.2 | −1.8 | −2.4 | −1.6 |
| 48 b 1 | 4.6 | 3.9 | 1.9 | 1.0 | 1.4 | 2.1 | −2.2 | −3.9 | −1.2 |
|  | 2.7 | 0.6 | 1.6 | 0.3 | 2.0 | 0.0 | −2.0 | −3.6 | −1.6 |
| 48 d 1 | 2.0 | 11.2 | 0.5 | −0.1 | 5.4 | 0.5 | −0.7 | −2.6 | 1.6 |
|  | 1.1 | 6.7 | 0.2 | 0.4 | 2.3 | 0.7 | −1.2 | −1.2 | 0.6 |
| V a 1 | 1.4 | 19.0 | 0.2 | 6.6 | 1.9 | 4.7 | 1.0 | 0.2 | 2.6 |
|  | 0.8 | 17.2 | 1.7 | 2.2 | 3.7 | −1.8 | −2.8 | −3.2 | 0.2 |
| V b 1 | 20.7 | 12.8 | 0.0 | 158.0 | 226.0 | 32.4 | 9.2 | 3.3 | 0.0 |
|  | −0.4 | 9.2 | 0.3 | 1.5 | 1.7 | 3.4 | 3.5 | −2.6 | 1.4 |
| V d 1 | −0.2 | 4.8 | 1.2 | 0.8 | 0.1 | 0.2 | −1.7 | 6.0 | −0.2 |
|  | 0.6 | 9.2 | 1.4 | 2.3 | 0.4 | 349.0 | 4.0 | 2.7 | 0.0 |
| VI a 1 | 4.7 | 2.2 | 0.0 | −0.2 | 1.2 | 0.9 | −4.0 | 0.0 | −1.2 |
|  | 2.2 | 1.0 | 0.4 | 1.8 | 37.4 | 1.1 | 6.4 | −2.4 | 1.3 |
| VI b 1 | 47.1 | 14.1 | 5.4 | 19.3 | −0.9 | 11.0 | −0.2 | −1.6 | 3.2 |
|  | 171.5 | 12.1 | 9.2 | 5.7 | 213.5 | 36.9 | −1.6 | −1.6 | 0.0 |
| VI d 1 | 1.2 | 2.4 | 1.6 | 0.0 | 4.8 | 0.9 | 0.4 | −0.2 | 2.8 |
|  | 265.6 | 18.1 | 15.8 | 128.7 | 535.5 | 47.8 | 0.9 | 0.8 | 3.9 |
| VII a 1 | 1.6 | 9.2 | 2.2 | 24.9 | 160.0 | −1.6 | −1.4 | −1.4 | −0.4 |
|  | 4.4 | 8.2 | 2.0 | 2.0 | 187.0 | 2.9 | −1.5 | −1.5 | −1.2 |
| VII b 1 | 105.5 | 33.7 | 7.4 | 116.5 | 588.0 | 9.4 | −1.9 | −0.8 | −0.9 |
|  | 145.5 | 25.4 | 14.8 | 33.2 | 720.0 | 54.6 | −1.6 | −1.4 | 1.6 |
| VII d 1 | 133.5 | 130.0 | 4.2 | 101.0 | 605.2 | 56.9 | 2.9 | −2.3 | 2.2 |
|  | 24.7 | 12.8 | 10.2 | 92.6 | 434.0 | 6.4 | −1.3 | −2.1 | −1.2 |
| VIII a 1 | 5.7 | 41.0 | 8.2 | 89.0 | 480.0 | 32.8 | 0.0 | 1.2 | −0.2 |

Table XIII-continued

| Example No. | Metal No. | | | | | | | | |
|---|---|---|---|---|---|---|---|---|---|
| | 1 | 2 | 3 | 4 | 5 | 6 | 7 | 8 | 10 |
| | 0.4 | 7.2 | 2.6 | 142.8 | 417.0 | 10.0 | 0.2 | −0.7 | −0.4 |
| VIII b 1 | 1.7 | 150.0 | 2.5 | 86.6 | 388.0 | 7.5 | 3.2 | 1.0 | 5.0 |
| | −0.8 | 85.3 | 5.4 | 245.0 | 442.0 | 12.5 | destr. | 6.4 | 7.8 |
| VIII d 1 | 16.8 | 160.0 | 7.3 | 311.7 | 357.0 | 14.4 | 28.8 | 21.6 | 8.2 |
| | 12.3 | 135.0 | 9.6 | 315.9 | 376.0 | 43.6 | 9.3 | 1.6 | 5.9 |

The changes in weight of the metal specimens are generally representative of the corrosion-preventing effect of an anticorrosive. In many cases, however, there are extreme differences in weight between parallel tests. The results of long-term tests provide the most reliable indication of corrosion prevention.

The procedure described in Examples 9 to 16 was also adopted in the following Examples 49 to 51. The compounds used were as follows:

Example 49: 2-($\epsilon$-dimethylaminopentyl)-benzimidazole
Example 50: $\Delta^2$-2-($\epsilon$-aminopentyl)-thiazoline
Example 51: 2-($\gamma$-phenylaminopropyl)-5-methyl benzimidazole.

Table XIV

| Example No. | Metal No. | | | | | |
|---|---|---|---|---|---|---|
| | 1 | 2 | 3 | 4 | 5 | 6 |
| 49 b | 0.4 | 0.8 | 0.3 | −1.3 | −0.6 | −0.7 |
| 50 b | −0.7 | 0.8 | 0.6 | −1.1 | −0.9 | −0.2 |
| 51 b | 1.2 | 6.4 | 1.4 | 0.2 | 0.4 | 3.6 |

EXAMPLES 52 and 53

Example 52: corresponds to Example 16
Example 53: corresponds to Example 34

In Example 52, the antifreeze agent had the following composition: 96% by weight of monoethylene glycol and 4% by weight of the anticorrosive used in Example 16.

In Example 53, the same anticorrosive as in Example 34 was used in a quantity of 1.35% by weight.

Table XV

| Example No. | Metal No. | | | | | |
|---|---|---|---|---|---|---|
| | 1 | 2 | 3 | 4 | 5 | 6 |
| 52 b | 0.0 | −0.2 | 0.0 | −0.4 | 0.0 | 2.8 |
| 53 b | −0.4 | 1.6 | 0.0 | −0.4 | 0.8 | 3.0 |

EXAMPLES 54 to 57

These comparison Examples demonstrate the technical advance which can be obtained by the process according to the invention over conventional inhibitors, such as benzimidazole, 2-methyl benzimidazole and 2-methyl benzothiazole.

In these Examples, 1.65% by weight of an anticorrosive having the following composition was used in water:

| 66.0 % | by weight of | sodium benzoate |
| 6.7 % | " | sodium nitrite |
| 13.0 % | " | borax |
| 7.85 % | " | soda |
| 0.05 % | " | sodium silicate |
| 4.9 % | " | sodium nitrate |
| 1.5 % | " | benz-"azole"-types |

Example 54: benzimidazole
Example 55: 2-methyl benzimidazole
Example 56: 2-methyl benzothiazole
Example 57: 2-($\epsilon$-aminopentyl)-benzimidazole.

Table XVI

| Example No. | Metal No. | | | | | |
|---|---|---|---|---|---|---|
| | 1 | 2 | 3 | 4 | 5 | 6 |
| 54 b | 0.0 | −1.4 | −0.2 | −0.8 | −0.4 | 10.0 |
| 55 b | 0.0 | 0.2 | −0.3 | 1.0 | 0.3 | 8.5 |
| 56 b | 3.2 | −1.2 | 1.0 | −1.0 | −2.1 | 9.8 |
| 57 b | −0.2 | 0.8 | 0.0 | 0.2 | 0.2 | 0.9 |

Examples illustrating the internal protection of oil tanks.

Test

Sampling after 14 days. Content of the active ingredient in the aqueous phase (0.5% by weight of sodium chloride in water): 2000 ppm.

I.
46.4% by weight of triethanolamine
8.1% by weight of p-toluic acid
37.9% by weight of sodium nitrite
7.6% by weight of 2-($\epsilon$-aminopentyl)-benzimidazole II.
46.4% by weight of triethanolamine
8.1% by weight of p-toluic acid
37.9% by weight of sodium nitrite
7.6% by weight of 2-($\epsilon$-aminopentyl)-benzthiazole Stoffels test (cf. Techn. Uberwachung Vol. 2, page 342 (1961)

Compositions I and II are effective in the aqueous phase (sea water according to DIN 50 900). In concentrations of 800 to 1600 ppm test plates with and without a layer of scale are unchanged after 3 months.

If the p-toluic acid in recipes I and II is replaced for example by p-chlorobenzoic acid or by p-nitrobenzoic acid, the corrosion-preventing effect is distinctly weaker. A little rust was detected in the Stoffels test.

EXAMPLES 59 to 64

Anticorrosives obtained by spray drying were used in these Examples. The solutions used had the following compositions:

| | Ingredients in g | recipe I | recipe II | recipe III |
|---|---|---|---|---|
| 1. | distilled water | 1700 | 2500 | 2500 |
| 2. | 2-($\epsilon$-aminopentyl)-benzimidazole | 10 | 12.5 | 12.5 |
| 3. | borax | 280 | 550 | 350 |

-continued

|  | Ingredients in g | recipe I | recipe II | recipe III |
|---|---|---|---|---|
| 4. | sodium nitrite | 135 | 166.5 | 166.5 |
| 5. | sodium nitrate | 100 | 122.5 | 122.5 |
| 6. | benzoate liquor (35 % by weight of sodium benzoate, 65 % by weight of water) | 3850 | 4600 | 4600 |
| 7. | soda | 160 | 196.5 | 200 |
| 8. | 2 % by weight sodium silicate solution in water | 250 | 62.5 | 62.5 |

Dissolution of substances 2 to 8 was carried out in the order indicated in the water heated to about 50° C.

After spray drying, the solid anticorrosive had the following composition:

|  | composition | recipe I | recipe II | recipe III |
|---|---|---|---|---|
| 1. | 2-(ε-aminopentyl)-benzimidazole | 0.56 % by weight | 0.55 % by weight | 0.57 % by weight |
| 2. | disodium tetraborate (anhydrous) | 8.15 % by weight | 12.70 % by weight | 8.50 % by weight |
| 3. | sodium nitrate | 7.47 % by weight | 7.30 % by weight | 7.65 % by weight |
| 4. | sodium nitrate | 5.56 % by weight | 5.40 % by weight | 5.62 % by weight |
| 5. | sodium benzoate | 74.70 % by weight | 70.80 % by weight | 74.20 % by weight |
| 6. | sodium carbonate | 3.28 % by weight | 3.20 % by weight | 3.40 % by weight |
| 7. | sodium silicate | 0.28 % by weight | 0.05 % by weight | 0.06 % by weight |

The water content is not included in the above compositions. In compositions I to III, it amounted to 6.8, 9.8 and 4.7% by weight, based in each case on the anticorrosive as a whole, i.e. to 7.3, 10.8 and 4.9% by weight, based additionally upon the quantity of solids calculated above at 100% by weight.

The following Examples demonstrate the use of a solid anticorrosive with the above composition, prepared by drying, in antifreeze agents and aqueous solutions. Examples 58 and 60 were carried out in the mixture of glycol and water according to ASTM D 13 84-65, whilst Examples 59 and 61 were carried out in water only. In all the Examples, procedure and assessment were carried out in accordance with ASTM D 13 84-65.

EXAMPLES 58 and 59

Spray-dried mixture I was used in a concentration of 1.65% by weight.

Table XVII

| Example No. | Metal No. | | | | | |
|---|---|---|---|---|---|---|
|  | 1 | 2 | 3 | 4 | 5 | 6 |
| 58 b | 0.8 | 1.6 | 1.8 | 0.0 | 1.3 | 1.7 |
|  | 0.8 | 1.8 | 0.8 | 1.2 | 4.3 | 2.7 |
| 59 b | 0.2 | 2.0 | 1.4 | 0.8 | 3.6 | 5.7 |
|  | 1.0 | 0.7 | 1.4 | 1.0 | 2.1 | 5.9 |

EXAMPLES 60 and 61

Spray-dried mixture II was used in a concentration of 1.65% by weight.

Table XVIII

| Example No. | Metal No. | | | | | |
|---|---|---|---|---|---|---|
|  | 1 | 2 | 3 | 4 | 5 | 6 |
| 60 b | 0.2 | 1.4 | 0.2 | 0.4 | 0.4 | 1.6 |
|  | 0.4 | 1.2 | 0.4 | 0.2 | 0.4 | 1.4 |
| 61 b | 2.2 | 2.6 | 0.4 | 0.4 | 0.9 | 8.5 |
|  | 1.2 | 1.4 | 0.0 | 0.8 | 0.2 | 4.7 |

EXAMPLES 62 to 64

The procedure adopted corresponded to or approximated ASTM 13 84-65. Spray-dried mixture III was used in a concentration of 1.0% by weight in Example 62, 1.35% by weight in Example 63 and 1.65% by weight in Example 64.

Table XIX

| Example No. | 1 | 2 | 3 | 4 | 5 | 6 | 7 | 11 |
|---|---|---|---|---|---|---|---|---|
| 62 a 1 | 0.2 | 1.3 | 0.4 | 1.0 | 1.7 | 0.6 | 2.2 | 0.0 |
|  | 0.0 | 3.6 | 0.0 | 1.0 | 0.9 | 2.5 | 2.7 | 1.0 |
| 63 a 1 | 0.4 | 4.3 | 0.6 | 0.8 | 0.6 | 1.1 | 1.5 | 0.2 |
|  | 0.4 | 0.2 | 0.2 | 1.0 | 0.2 | 0.6 | 2.3 | 0.6 |
| 64 a 1 | 0.6 | 2.0 | 0.8 | 0.8 | 0.8 | 0.0 | 1.0 | 0.6 |
|  | 0.2 | 1.1 | 0.8 | 1.2 | 0.8 | 2.7 | 2.3 | 2.0 |

What is claimed is:

1. Anticorrosive additive for aqueous solutions consisting essentially of an effective amount of a conventional corrosion inhibitor selected from the group consisting of sodium carbonate, sodium nitrite, sodium nitrate, borax, sodium dichromate, sodium silicate, an alkali salt of arsensous acid, arsenic acid, phosphorous acid, phosphoric acid, an alkali metal tungstate, an alkali salt of benzoic or toluic acid, an alkali metal salt of a phenol, an alkanolamine and an organosilicon compound and an amount of between 0.03 and 2% by weight of a heterocyclic nitrogen compound having the formula

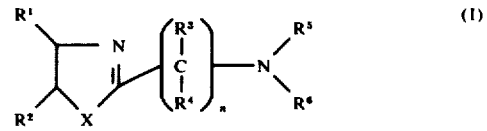

(I)

wherein
$R^1$ and $R^2$ are hydrogen or together with the carbon atoms to which they are attached represent an optionally substituted benzene ring;
$R^3$, $R^4$, $R^5$ and $R^6$ independently of one another are selected from the group of hydrogen, lower alkyl, phenyl and phenyl substituted by one or more lower alkyls;
X is sulphur or an imino group (NH) optionally substituted on the nitrogen atom; and
n is an integer from 1 to 13.

2. Anticorrosive additive of claim 1 wherein the heterocyclic nitrogen compound is selected from the group of
$\Delta^2$-2-(ε-aminopentyl)imidazoline,
$\Delta^2$-1-(β-aminoethyl)-2-(ε-aminopentyl)-imidazoline,
$\Delta^2$-2-(ε-aminopentyl)-thiazoline,
2-(β-amino-β-methylpropyl)-benzimidazole,
2-(δ-aminobutyl)-benzimidazole,
2-(ε-aminopentyl)-benzimidazole,
2-(γ-aminoundecyl)-benzimidazole, 2-(ε-methylaminopentyl)-benzimidazole,
2-(ε-aminopentyl)-1-phenyl benzimidazole,
2-(ε-aminopentyl)-5-methyl benzimidazole,
2-(γ-phenylaminopropyl)-5-methyl benzimidazole,
2-(γ-aminopropyl)-benzthiazole,
2-(β-amino-β-methylpropyl)-benzthiazole,
2-(ε-aminopentyl)-benzthiazole,
2-(γ-methylaminopropyl)-benzthiazole,
2-(ε-dimethylaminopentyl)-benzimidazole, and
2-(γ-aminopropyl)-benzimidazole.

3. Anticorrosive additive of claim 1 wherein the alkanolamine is triethanolamine.

4. Anticorrosive additive of claim 1 containing from 0.03 to 2% by weight of said heterocyclic nitrogen compound and
40 to 80% by weight of sodium benzoate,
4 to 10% by weight of sodium nitrite,
5 to 20% by weight of borax,
0 to 20% by weight of soda,
2 to 8% by weight of sodium nitrate and
0.1 to 2% by weight of sodium silicate.

5. Anticorrosive additive of claim 1 containing 0.2 to 1% by weight of said heterocyclic nitrogen compound and
60 to 80% by weight of sodium benzoate,
6 to 8% by weight of sodium nitrite,
5 to 15% by weight of borax,
0 to 10% by weight of soda,
4 to 7% by weight of sodium nitrate and
0.05 to 1% by weight of sodium silicate.

6. Anticorrosive additive of claim 1 containing about 0.5% by weight of 2-(ε-aminopentyl)-benzimidazole,
40 to 80% by weight of sodium benzoate,
4 to 10% by weight of sodium nitrite,
5 to 25% by weight of borax,
0 to 20% by weight of soda,
2 to 8% by weight of sodium nitrate and
0.1 to 2% by weight of sodium silicate.

7. Anticorrosive additive of claim 1 containing
0.03 to 2% by weight of said heterocyclic nitrogen compound,
40 to 80% by weight of sodium benzoate,
4 to 10% by weight of sodium nitrite,
2 to 12% by weight of disodium tetraborate,
0 to 9% by weight of sodium carbonate,
2 to 8% by weight of sodium nitrate,
0.01 to 2% by weight of sodium silicate
and up to 20% by weight of water and/or water of crystallization, based on the sum total of the foregoing.

8. Anticorrosive additive of claim 1 containing
0.03 to 2% by weight of said heterocyclic nitrogen compound,
60 to 80% by weight of sodium benzoate,
6 to 8% by weigh of sodium nitrite,
3 to 9% by weight of disodium tetraborate,
0 to 4% by weight of sodium carbonate,
4 to 7% by weight of sodium nitrate,
0.05 to 1% by weight of sodium silicate
and up to 20% by weight of water and/or water of crystallization, based on the sum total of the foregoing.

9. Anticorrosive additive of claim 1 containing 0.57% by weight of 2-(ε-aminopentyl)-benzimidazole, 8.50% by weight of anhydrous disodium tetraborate,
7.65% by weight of sodium nitrite,
5.62% by weight of sodium nitrate,
74.20% by weight of sodium benzoate,
3.40% by weight of sodium carbonate,
0.06% by weight of sodium silicate and
up to 20% by weight of water and/or water of crystallisation, based on the sum total of the foregoing.

10. Anticorrosive additive for aqueous solutions comprising an effective amount of a conventional corrosion inhibitor selected from the group of sodium carbonate, sodium nitrite, sodium nitrate, borax, sodium benzoate and sodium silicate and an amount of between 0.0001 and 0.4% by weight of a heterocyclic nitrogen compound having the formula

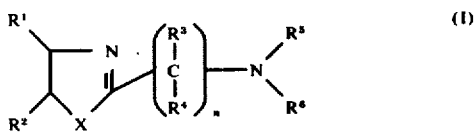

wherein
R$^1$ and R$^2$ are hydrogen or together with the carbon atoms to which they are attached represent an optionally substituted benzene ring;
R$^3$, R$^4$, R$^5$, and R$^6$ independently of one another are selected from the group of hydrogen, lower alkyl, phenyl and phenyl substituted by one or more lower alkyls;
X is sulphur or an imino group (NH) optionally substituted on the nitrogen atom; and
n is an integer from 1 to 13.

11. Corrosion-inhibited aqueous solution consisting essentially of and effective amount of a conventional corrosion inhibitor selected from the group consisting of sodium carbonate, sodium nitrite, sodium nitrate, borax, sodium dichromate, sodium silicate, an alkali salt of arsenous acid, arsenic acid, phosphorous acid, phosphoric acid, an alkali metal tungstate, an alkali salt of benzoic or toluic acid, an alkali salt of a phenol, an alkanolamine and an organosilicon compound and an amount of between 0.0005 and 0.2% by weight of a heterocyclic nitrogen compound having the formula:

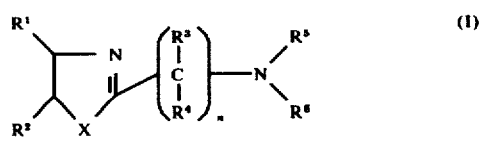

wherein
R$^1$ and R$^2$ are hydrogen or together with the carbon atoms to which they are attached represent an optionally substituted benzene ring;
R$^3$, R$^4$, R$^5$, and R$^6$ independently of one another are selected from the group of hydrogen, lower alkyl, phenyl, and phenyl substituted by one or more lower alkyls;
X is sulphur or an imino group (NH) optionally substituted on the nitrogen atom; and
n is an integer from 1 to 13.

12. Corrosion-inhibited aqueous solution of claim 11 wherein the heterocyclic nitrogen compounds are one or more selected from the group of
Δ$^2$-2-(ε-aminopentyl)imidazoline,
Δ$^2$-1-(β-aminoethyl)-2-(ε-aminopentyl)-imidazoline,
Δ$^2$-2-(ε-aminopentyl)-thiazoline,
2-(β-amino-β-methylpropyl)-benzimidazole,
2-(δ-aminobutyl)-benzimidazole,
2-(ε-aminopentyl)-benzimidazole,
2-(γ-aminoundecyl)-benzimidazole, 2-(ε-methylaminopentyl)-benzimidazole,
2-(ε-aminopentyl)-1-phenyl benzimidazole,
2-(ε-aminopentyl)-5-methyl benzimidazole,
2-(γ-phenylaminopropyl)-5-methyl benzimidazole,
2-(γ-aminopropyl)-benzthiazole,
2-(β-amino-β-methylpropyl)-benzthiazole,
2-(ε-aminopentyl)-benzthiazole,
2-(γ-methylaminopropyl)-benzthiazole,
2-(ε-dimethylaminopentyl)-benzimidazole, and
2-(δ-aminopropyl)-benzimidazole.

13. Corrosion-inhibited aqueous solution of claim 11 wherein the aqueous solution contains an antifreeze agent based on glycols and/or triols in an amount of 1 part by volume glycol or triol to 1–4 parts by volume water.

14. Corrosion-inhibited aqueous solution of claim 11 wherein the alkanolamine is triethanolamine.

15. Anticorrosive concentrate for oil tanks comprising
   2 to 10% by weight of a heterocyclic nitrogen compound having the formula,

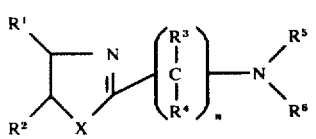

wherein
   R¹ and R² are hydrogen or together with the carbon atoms to which they are attached represent an optionally substituted benzene ring;
   R³, R⁴, R⁵, and R⁶ independently of one another are selected from the group of hydrogen, lower alkyl, phenyl and phenyl substituted by one or more lower alkyls;
   X is sulphur or an imino group (NH) optionally substituted on the nitrogen atom; and
   n is an integer from 1 to 13,
   20 to 50% by weight of triethanolamine,
   5 to 20% by weight of substituted benzoic acid and
   0 to 50% by weight of sodium nitrate.

16. Corrosion-inhibited aqueous solution comprising an effective amount of a conventional corrosion inhibitor selected from the group of sodium carbonate, sodium nitrite, sodium nitrate, borax, sodium benzoate and sodium silicate and an amount of between 0.0005 and 0.2% by weight of a heterocyclic nitrogen compound having the formula

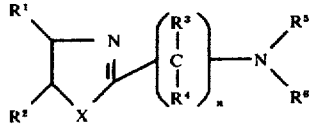

wherein
   R¹ and R² are hydrogen or together with the carbon atoms to which they are attached represent an optionally substituted benzene ring;
   R³, R⁴, R⁵, and R⁶ independently of one another are selected from the group of hydrogen, lower alkyl, phenyl, and phenyl substituted by one or more lower alkyls;
   X is sulphur or an imino group (NH) optionally substituted on the nitrogen atom; and
   n is an integer from 1 to 13.

17. Process for inhibiting the corrosion of materials subject to corrosive attack by aqueous solutions which comprises contacting such materials with a corrosion-inhibited aqueous solution consisting essentially of an effective amount of a conventional corrosion inhibitor selected from the group consisting of sodium carbonate, sodium nitrite, sodium nitrate, borax, sodium dichromate, sodium silicate, an alkali salt of arsenous acid, arsenic acid, phosphorous acid, phosphoric acid, an alkali metal tungstate, an alkali metal salt of benzoic or toluic acid, an alkali salt of a phenol, an alkanolamine and organosilicon compound and an amount of between 0.0005 and 0.2% by weight of at least one heterocyclic nitrogen compound having the formula

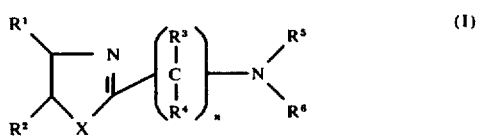

wherein
   R¹ and R² are hydrogen or together with the carbon atoms to which they are attached represent an optionally substituted benzene ring;
   R³, R⁴, R⁵, and R⁶ independently of one another are selected from the group of hydrogen, lower alkyl, phenyl and phenyl substituted by one or more lower alkyls;
   X is sulphur or an imino group (NH) optionally substituted on the nitrogen atom; and
   n is an integer from 1 to 13.

18. Process of claim 17 wherein the heterocyclic nitrogen compound is selected from the group
   Δ²-2-(ε-aminopentyl)imidazoline,
   Δ²-1-(β-aminoethyl)-2-(ε-aminopentyl)-imidazoline,
   Δ²-2-(ε-aminopentyl)-thiazoline,
   2-(β-amino-β-methylpropyl)-benzimidazole,
   2-(δ-aminobutyl)-benzimidazole,
   2-(ε-aminopentyl)-benzimidazole,
   2-(γ-aminoundecyl)-benzimidazole,
   2-(ε-methylaminopentyl)-benzimidazole,
   2-(ε-aminopentyl)-1-phenyl benzimidazole,
   2-(ε-aminopentyl)-5-methyl benzimidazole,
   2-(γ-phenylaminopropyl)-5-methyl benzimidazole,
   2-(γ-aminopropyl)-benzthiazole,
   2-(β-amino-β-methylpropyl)-benzthiazole,
   2-(ε-aminopentyl)-benzthiazole,
   2-(γ-methylaminopropyl)-benzthiazole,
   2-(ε-dimethylaminopentyl)-benzimidazole, and
   2(δ-aminopropyl)-benzimidazole.

19. Process of claim 17 wherein the alkanolamine is triethanolamine.

20. Process for inhibiting the corrosion of materials subject to corrosive attack by aqueous solutions which comprises contacting such materials with a corrosion-inhibited aqueous solution comprising an effective amount of a conventional corrosion inhibitor selected from the group of sodium carbonate, sodium nitrite, sodium nitrate, borax, sodium benzoate and sodium silicate and an amount of between 0.0005 and 0.2% by weight of at least one heterocyclic compound having the formula

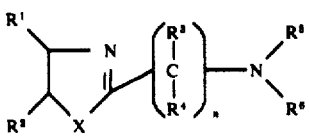

wherein
- R¹ and R² are hydrogen or together with the carbon atoms to which they are attached represent an optionally substituted benzene ring;
- R³, R⁴, R⁵, and R⁶ independently of one another are selected from the group of hydrogen, lower alkyl, phenyl and phenyl substituted by one or more lower alkyls;
- X is sulphur or an imino group (NH) optionally substituted on the nitrogen atom; and
- n is an integer from 1 to 13.

21. Antifreeze additive consisting essentially of a glycol and/or a triol, an effective amount of a conventional corrosion inhibitor selected from the group consisting of sodium carbonate, sodium nitrite, sodium nitrate, borax, sodium dichromate, sodium silicate, an alkali metal salt of arsenous acid, arsenic acid, phosphorous acid, phosphoric acid, an alkali metal tungstate, an alkali salt of benzoic or toluic acid, an alkali salt of a phenol, an alkanolamine and an organosilicon compound and an amount of between 0.001 and 0.4% by weight of a heterocyclic nitrogen compound having the formula

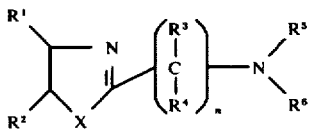

wherein
- R¹ and R² are hydrogen or together with the carbon atoms to which they are attached represent an optionally substituted benzene ring;
- R³, R⁴, R⁵, and R⁶ independently of one another are selected from the group of hydrogen, lower alkyl, phenyl and phenyl substituted by one or more lower alkyls;
- X is sulphur or an imino group (NH) optionally substituted on the nitrogen atom; and
- n is an integer from 1 to 13.

22. Antifreeze additive of claim 21 wherein said heterocyclic nitrogen compound is selected from the group of
Δ²-2-(ε-aminopentyl)imidazoline,
Δ²-1-(β-aminoethyl)-2-(ε-aminopentyl)-imidazoline,
Δ²-2-(ε-aminopentyl)-thiazoline,
2-(β-amino-β-methylpropyl)-benzimidazole,
2-(δ-aminobutyl)-benzimidazole,
2-(ε-aminopentyl)-benzimidazole,
2-(γ-aminoundecyl)-benzimidazole,
2-(ε-methylaminopentyl)-benzimidazole,
2-(ε-aminopentyl)-1-phenyl benzimidazole,
2-(ε-aminopentyl)-5-methyl benzimidazole,
2-(γ-phenylaminopropyl)-5-methyl benzimidazole,
2-(γ-aminopropyl)-benzthiazole,
2-(β-amino-β-methylpropyl)-benzthiazole,
2-(ε-aminopentyl)-benzthiazole,
2-(γ-methylaminopropyl)-benzthiazole,
2-(ε-dimethylaminopentyl)-benzimidazole, and
2-(δ-aminopropyl)-benzimidazole.

23. Antifreeze of claim 21 wherein the alkanolamine is triethanolamine.

24. Antifreeze additive of claim 21 containing from 0.002 to 1.0% by weight of said heterocyclic nitrogen compound,
1.0 to 10.0% by weight of sodium benzoate,
0.1 to 1.0% by weight of sodium nitrate,
0.1 to 1.5% by weight of borax
0 to 3.0% by weight of soda,
0.1 to 1.0% by weight of sodium nitrate and
0.002 to 1.0% by weight of sodium silicate.

25. Antifreeze additive consisting of
0.5% by weight of said heterocyclic nitrogen compound,
78.75% by weight of sodium benzoate,
7.8% by weight of sodium nitrite,
7.0% by weight of borax,
0.05% by weight of sodium silicate, and
5.9% by weight of sodium nitrate.

26. Antifreeze additive consisting of
0.5% by weight of said heterocyclic nitrogen compound,
66.25% by weight of sodium benzoate,
6.65% by weight of sodium nitrite,
13.8% by weight of borax,
7.85% by weight of soda,
0.05% by weight of sodium silicate, and
4.9% by weight of sodium nitrate.

27. Antifreeze additive comprising glycols and/or triols, an effective amount of a conventional corrosion inhibitor selected from the group of sodium carbonate, sodium nitrite, sodium nitrate, borax, sodium benzoate and sodium silicate and an amount of between 0.0001 and 0.4% by weight of a heterocyclic nitrogen compound having the formula

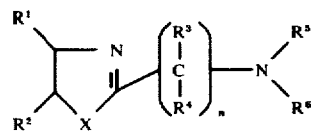

wherein
- R¹ and R² are hydrogen or together with the carbon atoms to which they are attached represent an optionally substituted benzene ring;
- R³, R⁴, R⁵, and R⁶ independently of one another are selected from the group of hydrogen, lower alkyl, phenyl and phenyl substituted by one or more lower alkyls;
- X is sulphur or an imino group (NH) optionally substituted on the nitrogen atom; and
- n is an integer from 1 to 13.

* * * * *

UNITED STATES PATENT OFFICE
CERTIFICATE OF CORRECTION

Patent No. 4,000,079    Dated December 28, 1976

Inventor(s) Christian Rasp et al.    Page 1 of 2

It is certified that error appears in the above-identified patent and that said Letters Patent are hereby corrected as shown below:

Column 7, line 24, "with the" should read -- will be --.
Column 8, line 65, "quantity" should read -- quality --.
Column 9, line 9, "(temporary hardness)" should read -- (permanent hardness) --;
    line 10, "(permanent hardness)" should read -- (temporary hardness) --.
Column 12, line 27, before "by weight of sodium nitrate" insert -- 4.9 % --.
Column 16, Table IX, last line, Example No. "IVb" should read -- IVb 1 --.
Column 17, line 41, before "4.0% " sodium benzoate" insert as the first item in the table -- 94.24% by weight of monoethylene glycol --.

UNITED STATES PATENT OFFICE
CERTIFICATE OF CORRECTION

Patent No. 4,000,079      Dated December 28, 1976

Inventor(s) Christian Rasp et al.      Page 2 of 2

It is certified that error appears in the above-identified patent and that said Letters Patent are hereby corrected as shown below:

Column 22, line 68, "2-(γ-aminoundecyl)-benzimidazole" should read -- "2-(λ-aminoundecyl)-benzimidazole --.
Column 24, line 30, "and" should read -- an --;
          line 68, "2-(γ-aminoundecyl)-benzimidazole" should read -- 2-(λ-aminoundecyl)-benzimidazole --.
Column 26, line 44, "2-(γ-aminoundecyl)-benzimidazole" should read -- 2-(λ-aminoundecyl)-benzimidazole --.
Column 27, line 60, "2-(γ-aminoundecyl)-benzimidazole" should read -- 2-(λ-aminoundecyl)-benzimidazole --.

Signed and Sealed this

Tenth Day of May 1977

[SEAL]

Attest:

RUTH C. MASON
Attesting Officer

C. MARSHALL DANN
Commissioner of Patents and Trademarks